United States Patent
Beier et al.

(10) Patent No.: US 9,266,353 B2
(45) Date of Patent: Feb. 23, 2016

(54) METHOD FOR PRINTING AN OBJECT HAVING AT LEAST ONE NON-PLANAR, CONTOURED OR THREE-DIMENSIONAL SURFACE

(71) Applicant: HEIDELBERGER DRUCKMASCHINEN AG, Heidelberg (DE)

(72) Inventors: Bernard Beier, Ladenburg (DE); Heiner Pitz, Weinheim (DE); Matthias Schloerholz, Plankstadt (DE); Thomas Wolf, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/494,796

(22) Filed: Sep. 24, 2014

(65) Prior Publication Data
US 2015/0042716 A1    Feb. 12, 2015

Related U.S. Application Data

(63) Continuation of application No. PCT/EP2013/000808, filed on Mar. 15, 2013.

(30) Foreign Application Priority Data

Mar. 29, 2012    (DE) .......................... 10 2012 006 371

(51) Int. Cl.
*B41J 29/38* (2006.01)
*B41J 3/407* (2006.01)
*B41J 11/00* (2006.01)

(52) U.S. Cl.
CPC .............. *B41J 3/4073* (2013.01); *B41J 11/002* (2013.01)

(58) Field of Classification Search
CPC ............................. B41J 3/4073; B41J 11/002
USPC ........................................................... 347/14
See application file for complete search history.

(56) References Cited

U.S. PATENT DOCUMENTS 4,304,815 A * 12/1981 Cugasi, Jr. ................... 428/40.1
4,586,038 A *  4/1986 Sims et al. .................... 345/586
(Continued)

FOREIGN PATENT DOCUMENTS

CN          1209770 A      3/1999
CN        101130312 A      2/2008
(Continued)

*Primary Examiner* — Justin Seo
*Assistant Examiner* — Michael Konczal
(74) *Attorney, Agent, or Firm* — Laurence A. Greenberg; Werner H. Stemer; Ralph E. Locher

(57) ABSTRACT

A method prints an object, for example a vehicle and specifically the body thereof, wherein at least one area of the surface of the object is printed. The method includes: providing an image; three-dimensionally measuring at least the area; generating a number of spatial points in correspondence with the area; generating a three-dimensional net corresponding with the area; generating path data, i.e. a three-dimensional path for moving a robot for an inkjet printer head; generating raster data, i.e. a raster matrix, in particular a three-dimensional or higher raster matrix, for actuating the inkjet printer head; moving the robot, for example an articulated arm robot, utilizing the path data; and printing the image by the inkjet printer head utilizing the raster data. The method permits multi-color printing of any image onto so-called 3D surfaces of any shape.

20 Claims, 2 Drawing Sheets

(56) References Cited

U.S. PATENT DOCUMENTS

| | | |
|---|---|---|
| 4,844,947 A | 7/1989 | Kasner et al. |
| 4,937,678 A | 6/1990 | Murai et al. |
| 5,110,615 A | 5/1992 | Maiorca et al. |
| 5,255,352 A | 10/1993 | Falk |
| 5,273,079 A | 12/1993 | Beyaert et al. |
| 6,102,536 A | 8/2000 | Jennel |
| 7,350,890 B2 * | 4/2008 | Baird ............ B41J 3/4073 347/2 |
| 7,806,493 B2 * | 10/2010 | Gazeau et al. ............ 347/8 |
| 7,981,462 B2 | 7/2011 | Buestgens |
| 8,038,236 B2 | 10/2011 | Gauss et al. |
| 8,141,970 B2 | 3/2012 | Noll |
| 2001/0005942 A1 * | 7/2001 | Patton et al. ............ 33/18.1 |
| 2001/0017085 A1 * | 8/2001 | Kubo et al. ............ 101/35 |
| 2007/0062383 A1 | 3/2007 | Gazeau et al. |
| 2011/0262622 A1 * | 10/2011 | Herre et al. ............ 427/8 |

FOREIGN PATENT DOCUMENTS

| | | |
|---|---|---|
| DE | 3737455 A1 | 5/1988 |
| DE | 10202553 A1 | 8/2003 |
| DE | 102006034060 A1 | 1/2008 |
| DE | 102008053178 A1 | 5/2010 |
| EP | 0317219 B1 | 8/1994 |
| EP | 1839883 A1 | 10/2007 |

* cited by examiner

METHOD FOR PRINTING AN OBJECT HAVING AT LEAST ONE NON-PLANAR, CONTOURED OR THREE-DIMENSIONAL SURFACE

CROSS-REFERENCE TO RELATED APPLICATION

This is a continuation application, under 35 U.S.C. §120, of copending international application No. PCT/EP2013/000808, filed Mar. 15, 2013, which designated the United States; this application also claims the priority, under 35 U.S.C. §119, of German patent application No. DE 10 2012 006 371.7, filed Mar. 29, 2012; the prior applications are herewith incorporated by reference in their entireties.

BACKGROUND OF THE INVENTION

Field of the Invention

The present invention relates to a method and a system for printing an object.

It is known to paint the bodywork of a vehicle in a single color or else in multiple colors. Multi-color painting can be carried out as early as during production or later. It is also already known to provide the bodywork with colored images. For example, advertising is provided on the side or the rear of the vehicle. Normally, such advertising is first printed onto film and the film is then transferred to the bodywork. The application of the film is all the more time-consuming and difficult, the larger the film is and the more curves the bodywork has. On the other hand, artistically sophisticated images are normally applied manually by the so-called air brush technique.

Published, non-prosecuted German patent application DE 37 37 455 A1 (corresponding to U.S. Pat. No. 4,844,947) discloses an apparatus for producing colored patterns. By use of an inkjet system that is computer-controlled and guided by a robot, for example, screened images in solid color (3 primary colors) are produced as bodywork decorations. The images can additionally be customer-specific.

Published, non-prosecuted German patent application DE 10 2008 053 178 A1 (corresponding to U.S. patent publication No. 2011/0262622) discloses a coating apparatus for bodywork having a multi-axis robot and an inkjet printer head mounted thereon. The head can be connected to one or more color changers or color mixers and it is possible for colors to be changed and mixed (e.g. CMYK color system) and fed to the nozzles of the head. However, the color mixing can also be carried out on the component surface. The object of DE 10 2008 053 178 A1 is to reduce the so-called overspray. It is also intended to be possible to print details and graphics specifically. In one variant, multiple printer heads are provided, are guided jointly on a robot and can be swiveled relative to one another, which permits adaptation to curved component surfaces.

In addition, a system is offered under the name "Michelangelo", containing a frame and an inkjet head which can be moved on the frame in the X and Y direction and in the Z direction. "Michelangelo" makes it possible to provide relatively flat sidewalls, for example of utility vehicles, with any desired multicolored images. The system uses a mechanical distance measurement between head and printing surface and permits only low resolutions to be printed. Such a system is disclosed in European patent EP 317 219 B1 (corresponding to U.S. Pat. No. 4,937,678).

Published, non-prosecuted German patent application DE 102 02 553 A1 (corresponding to U.S. Pat. No. 7,981,462) also discloses a system, which could be designated a "digital paintbrush". This is a manually guided system with a matrix arrangement of nozzles for printing, for example, facades or large-format advertising surfaces, that is to say generally relatively flat surfaces. The position of the printing head is determined continuously and the application of color to those points which have already been printed is prevented.

SUMMARY OF THE INVENTION

Against this background, it is an object of the invention to devise a system with which object surfaces of any desired shape can be printed with any desired images.

A method according to the invention for printing an object, wherein at least one area of the surface of the object is printed, contains the following method steps of: providing an image; three-dimensionally measuring at least the area; generating a number of spatial points corresponding to the area; generating a three-dimensional network corresponding to the area; generating path data, i.e. a three-dimensional path for moving a robot for an inkjet printer head; generating raster data, i.e. a raster matrix, in particular a three-dimensional or higher raster matrix, for actuating the inkjet printer head; moving the robot by utilizing the path data; and printing the image by use of the inkjet printer head, utilizing the raster data.

A preferred development of the method according to the invention can be distinguished by one of the following synchronization method steps: printing the image in dependence on a movement of the robot; or moving the robot in dependence on the image to be printed.

A preferred development of the method according to the invention can be distinguished by the following method step: drying and/or hardening and/or pinning (point by point anchoring to the sub-base) of the color or of the paint by using a robot-guided dryer head following the printing, in particular by using ultraviolet radiation, NIR radiation, IR radiation, hot air and/or laser radiation. Alternatively, hardening can also be carried out thermally or chemically with thermal acceleration (e.g. in accordance with the "Natural Cure" method from the company Tritron GmbH in Battenberg-Dodenau, Germany). Furthermore, what are known as latex inks, such as "Aquares" from the company Sepiax Ink Technology in Klagenfurt, Austria can be used. The drying can also be carried out in a separate drying chamber without robot guidance.

A preferred development of the method according to the invention can be distinguished by the following method step: cleaning, in particular washing and drying, and optionally powdering at least of the area before the three-dimensional measuring.

A preferred development of the method according to the invention can be distinguished by one of the following method steps: static three-dimensional measurement of the area by using a fixed-location measuring system during the measurement; or dynamic three-dimensional measurement of the area by using a robot-guided measuring head.

A preferred development of the method according to the invention can be distinguished by the following method step: application of an undercoat and/or a primer at least in the area, before the printing.

A preferred development of the method according to the invention can be distinguished by one of the following method steps: printing a first part of the image with the inkjet printer head; moving, in particular rotating, the object into a changed position; and printing a second part of the image with the inkjet printer head.

A preferred development of the method according to the invention can be distinguished by the following method step: changing the inkjet printer head for another, different type of printer head, in particular a different type of inkjet printer head.

A preferred development of the method according to the invention can comprise, as further pre-treatment process steps, a corona treatment, an atmospheric plasma treatment, a flame treatment and/or application of hot air.

A preferred development of the method according to the invention can contain, as further post-treatment process steps, irradiation with IR or NIR, an application of hot air and/or a heat treatment in an oven. The post-treatment is used in particular to improve adhesion.

The heat treatment (both as pre-treatment and as post-treatment) can generate surface temperatures of about 40° C. to about 240° C., preferably from about 60° C. to about 140° C. The heat treatment (both as pre-treatment and as post-treatment) can be carried out over a time interval from about 1 ms to about 1 hour, preferably from about 1/10 s to about 10 min.

A system according to the invention for printing an object, which prints at least one area of the surface of the object, has the following features: a cleaning device for cleaning at least the area; a measuring device for three-dimensionally measuring at least the area and for generating measured results; a computer for generating a raster matrix, in particular a three-dimensional or higher raster matrix; a robot, in particular one of the following robots: articulated-arm robot, parallel kinematic robot, gantry robot; at least one effector, in particular one of the following heads: inkjet printer head, UV drying head, measuring head, projection head; a computer for activating the robot; and a computer for actuating the effector.

The system according to the invention has a robot and a printer head held on the latter. The head is guided by the robot along and at a distance from the surface of the object to be printed. Data for the image to be printed and data about the surface of the object is fed to a computer. The data about the surface of the object is determined in advance by measurement. The computer calculates which point of the image will be printed on which point of the object surface. In the case of multi-color printing, this calculation is carried out for each color separation. The calculated data is used for the path guidance of the robot and the activation of the printer head.

The system and the method carried out by using the system achieve a printing accuracy of at least 100 dpi (1/4 mm printing accuracy) up to 300 dpi. Printing accuracies of about 1/10 mm are preferred when printing relatively large objects, such as vehicles.

A further method according to the invention is a method for printing an object, in particular a vehicle, with at least one image, wherein the image is chosen by a customer and wherein the chosen image is printed onto the object on a surface area chosen by the customer via a service provider by using at least one of the aforementioned methods and/or by using the aforementioned system. An alternative application takes place within the context of mass production of the objects, in particular of the vehicles. For instance, mass-produced products can be changed and/or configured individually in accordance with the invention at the end of the production process.

In the following text, definitions are given for terms which are used in the application.

Object—A three-dimensional body having a surface which has at least one curve, an edge, a bend, a hole and/or an undercut, etc., for example a vehicle (land-based, water-based, aircraft and/or space vehicle) for the transport of goods and/or persons. Specific examples are passenger automobiles with the bodywork thereof, utility vehicles having large-area sidewalls, the tank of a motorcycle or the helmet of a motorcyclist. Further examples are refrigerators or other so-called "white goods", computer housings, furniture, toys or case shells.

Image—A two-dimensional area in which a text, a pattern, a logo, a drawing, a photograph, a color gradient and/or a color change is located (rastered or unrastered).

Customer—The person who requests the service provider to apply an image to an object.

Service provider—The person who provides the service of applying an image to an object.

System provider—The person who provides the service provider with hardware, software and/or data to carry out the provision of the service, for example for rent or for purchase.

Producer—The person who produces the hardware and/or the software or integrates the same from already existing components. The producer can also be the system provider.

Robot—A stationary or mobile moving apparatus having multiple axes for the movement of an effector, for example a printer head and/or a dryer head and/or a measuring head and/or a projection head. It can also be an industrial robot (other designation: robot arm or manipulator), a gantry robot or else a combination of the two (multiple robot arms—preferably two or three—on a gantry are also possible). The industrial robot can be implemented as an articulated-arm robot (5, 6, 7 or more axes) or as a parallel kinematic robot. It is also possible for a smaller robot arm to be arranged on a larger robot arm. The gantry robot can be equipped with 3 linear axes (XYZ coordinate system). Bionic systems are also possible. The robot can, moreover, be held on a linear guide or a rotary table, wherein the linear guide or the rotary table can be incorporated into the robot kinematics and control system. A gantry that can be swiveled or tilted is also possible.

General Description

1. Preparation of the Data

The customer can provide the service provider with two-dimensional data about the image (jpg, tiff, pdf or the like), for example by use of mobile storage media or via a data network. However, the data can also be loaded from generally accessible databases or from databases belonging to the service provider or the system provider. If the system is used at a mass producer, for example a vehicle manufacturer, then the images can also be provided by the mass producer.

Three-dimensional data about the object, in particular the surface of the latter, can likewise be loaded from generally accessible databases or from databases of the service provider, the system provider or the manufacturer of the object, for example the mass producer. However, it is preferred to measure the object individually before the printing and to use the individual data obtained in the process for the printing, since in this way it is possible also to take special features of the object into account, for example attachments and external fittings or damage. The service provider and/or the system provider (or else the mass manufacturer) can store individual object data from the measurement and combine the data to form a database, which classifies the data and keeps it ready for the subsequent utilization. For instance, scanned surfaces of vehicles can be memorized and stored in a manner classified by vehicle model. By using a comparison of multiple measurements on identical vehicles, for example Opel Vectra B Combi, a generalized dataset, which reproduces the general features of the bodywork and can be used to display the image on the vehicle even before the individual measurement, can be created for the respective model.

Provision can be made to display the anticipated image to the customer two-dimensionally or three-dimensionally on the object, for example on a 2-D or 3-D display, by a projection onto the object or by so-called augmented reality spectacles. For the projection, what is known as a beamer, which is held in a stationary manner, for example, or on a robot, can be used. In this case, the customer can bring up desired changes, for example size, position, background color, color space and/or perspective, image manipulations (e.g. expansions, compressions), which the service provider then implements. It is also possible here to define which areas of the object surface are not to be printed, for example door handles or windows. In addition, the changed image can be displayed again on the object. Alternatively, the customer can carry out desired changes at any desired location, therefore even at home, by means of software or an app provided to him.

All the aforementioned data and changes are taken into account in the software for printing the object.

2. Preparing the Object for the Measurement

If necessary, repairs can also be carried out before the printing, for example dent removal, filling and grinding. If necessary, external fittings can also be removed, for example antennas, mirrors, spoiler and/or tow bar.

If necessary, older images can be removed before the printing, in particular if these are images which have been applied as a film. The removal can be carried out by means of: solvents (e.g. acetone), hot steam, grinding compounds, laser radiation and/or bleaching UV radiation. In this case, either only the color layer to be removed can be removed on its own or, in addition, an undercoat, an intermediate layer and/or an adhesion promoter layer can also be removed at the same time.

If the object has previously already been printed in accordance with the invention or in a similar way, the existing image can be removed as follows: start to dissolve and remove the image, in particular if the latter has not been provided with a covering varnish, for example by using a solvent spray, polishing pad, water jet, brushes, rotating brushes, carwash and/or steam jet. The solvent can be a pure organic solvent, for example acetone or isopropyl alcohol, or a mixture, for example benzene or, for example, acetone with ethanol, or an aqueous or partially aqueous system, for example water or, for example, isopropyl alcohol with water. The solvent can additionally contain one or more additives. An additive can be a classic surfactant, for example a micelle former or an otherwise surface-active or interface-active substance, e.g. semi-perfluorophosphonic acid, polyether siloxane. Scouring particles can also be contained, such as is usual, for example, in current auto paint polishing pastes.

It is also possible for so-called "intelligent fluids" to be used (e.g. "DWR 95 PLUS liquid press roll cleaner" from the company bubbles & beyond GmbH, Leipzig). The cleaning operation is carried out as follows: spraying the object with the partially aqueous, commercially available cleaner "DWR 95 Plus liquid"; 1 to 60 seconds duration of action, the cleaning agent creeping under the existing colored areas and thus reducing or canceling the adhesion to the substrate; washing off or rubbing off the color and the cleaner; if necessary, rinsing with water or a second partially aqueous cleaner, e.g. water with surfactant; drying with warm air. This process is preferably carried out in an appropriately equipped carwash.

Finally, in order to remove dust, dirt, protective wax or the like, the object can be subjected to cleaning, e.g. washed and dried.

It may be necessary for a calibration of the following measurement to determine the existing color of the object first (i.e. the color locus thereof in a color space chosen for the subsequent printing), e.g. the color of a paint.

In addition, for a sharper-contour measurement of the object that is less susceptible to faults, it may be necessary to powder the surface of the object, preferably with white powder, or to render the surface non-reflective with an antireflective spray. Provision can also be made to print on an optically scattering agent or a pattern locally, e.g. via an inkjet. The pattern can lead to desired Moiré phenomena during the use of strip projection measuring methods. The powder can simultaneously have a cleaning action and/or act as an undercoat for the subsequent printing, e.g. with UV inks. In the latter case, the powder would not be removed after the measurement but left on the surface and would be removed only after the printing.

3. Measuring the Object

The three-dimensional measurement of the section/sections of the surface of the object that is/are to be printed or of the entire surface is carried out. In the process, the spatial points of the surface or the section/sections are obtained in the form of a so-called point cloud with a preferred precision in all three spatial directions of less than about 1 mm or particularly preferably in the region of about 0.1 mm. The object, in particular if it is a vehicle, is preferably located in a chamber for this purpose, preferably in a hall, and is preferably fixed mechanically and positioned in a defined manner in the chamber.

In order subsequently to be able to assemble a single point cloud without errors from multiple individual measurements, it may be necessary to use orientation marks in the chamber, for example adhesive dots, spheres and/or high-contrast marks. These can be located outside or inside the object or applied to the surface of the latter, for example adhesive dots on the vehicle mirrors, the windows, the license plates or the lights or spheres with tripod on the vehicle roof or checkerboard-like patterns (e.g. even on walls of the hall). Striking points of the object itself can also be used as orientation marks, e.g. license plate, door locks or antennas.

It is possible to use commercially available 3-D measuring systems which, for example, operate on the basis of white light, laser strip projection, propagation time measurements, photogrammetry or optical tracking.

The measurement can be carried out statically: multiple 3-D measuring systems are positioned in fixed locations around the object (e.g. on the hall ceiling or the hall walls), or a mobile 3-D measuring system is repeatedly re-positioned. The measurements supply a three-dimensional, digital point cloud of the object or the surface of the latter that is to be assembled. In practical terms, mention should be made of the device "Faro Laserscanner Focus 3D" from the Faro company, Germany for such measurements (1 to 5 m working distance, 1 mm data precision).

The measurement can be carried out dynamically: for this purpose, a handheld measuring instrument is guided around the object manually or by using a robot. Here, the mechanical path guidance can fall back on three-dimensional data about a corresponding object in the existing databases, e.g. on 3-D bodywork data from the vehicle manufacturer. In addition, use can be made of a distance sensor. In this way, the measuring instrument can be guided at the selected working distance from the object. The data can be acquired on the basis of a (world) coordinate system, e.g. relative to the hall or other selected fixed points. Alternatively, the data can be acquired on the basis of already acquired data about the object, for example strip-like mutually adjoining measuring sections. In practical terms, mention should be made of the device "Faro Laser ScanArm" from the Faro company, Germany for such measurements (8 to 10 cm working distance, 0.1 mm data precision) or devices from the Steinbichler Optoelektronik company, Germany.

The measurement can be carried out in a cascaded manner: In this case, the surface is initially measured accurately to about 1 to about 10 millimeters in a first step and at high speed, e.g. statically (see above). After that, critical sections of the surface having extreme curves, edges, bends or the like can be re-measured in a second step with higher resolution and at a lower speed, e.g. statically or dynamically (see above). Points at which (finer) re-measurement is required can be identified, for example, from a superimposition of the image to be printed with the (coarser) position data from the first step, since it is then possible to detect where image areas and extreme points coincide.

The second step can also be carried out for the first time during the printing of the object. For this purpose, the measuring instrument is arranged upstream of a printer head and, during the path guidance of the printer head by the robot, supplies position data in order to regulate the path guidance of the printer head accurately to about $1/10$ to about $1/100$ mm. The measured data can in this case be referenced to the aforementioned orientation marks (for the adaptation of the point cloud). Alternatively, the measured data can be referenced to already printed, adjacent areas. However, the latter requires additional video sensors to record the already printed adjacent section, and data processing which, during the printing by using the recorded images, detects where the printer head is currently located and takes this into account in the further path guidance. In practical terms, mention should be made once more of the device "Faro Laser ScanArm" from the Faro company, Germany, which is even able to supply data during a movement. Of course, the robot must be capable of being guided by of the data updated continuously in this way. In practical terms, robots from the Kuka Company, Germany, should be mentioned here. It would also be conceivable to correct the position of the printer head accurately to about $1/100$ mm continuously on the basis of the measured position data by a piezo-driven XYZ actuating mechanism on the robot.

4. Reworking the Data

By using the measured position data of the surface of the object (from the point cloud), a 3-D network corresponding to the measured surface can be generated by using commercially available software, e.g. PolyWorks from the company InnovMetric, Canada. In the process or thereafter, by software, optimization and sorting of the data can be carried out, for example existing radii of curvature, surfaces and edges can be determined. In this way, in the case of vehicles, for example, windowpanes, the seals of the latter, license plates, door locks or the like can be identified and excluded from the areas to be printed and from the path guidance to be planned.

It may be advantageous to reduce the 3-D position data of the measurement locally or even globally, e.g. in order to accelerate the generation of the 3-D network. The reduction can be carried out as a function of the image and/or of the object. Locally, it may also be advantageous to make the 3-D position data denser by interpolation, e.g. if the local measurement supplied too little data.

The data that is then available (point cloud, 3-D network and data determined from the latter) is used as input variables both during the planning of the 3-D robot path guidance and during the 3-D RIP (Raster Image Processing) of the 2-D image data. Further input variables are the size of the inkjet head (or differently shaped inkjet heads being used), the working distance (working range to be maintained of the nozzle openings of the inkjet head from the object surface), the chamber, together with obstacles, in which the object is located and in which the robot moves, as well as limits to which the movement of the robot is subject.

During the preparation of the data for the 3-D path guidance, it is advantageous to define areas into which the robot must not penetrate and areas in which the robot can move freely. The first are generally correlated with the object measured, i.e. the robot must not collide with the object and must maintain a minimum distance. This applies not only to the printer head held on the robot but also to the whole of the robot, e.g. the arm parts and joints of the latter, which, during robot movements during the path guidance, may remain and move only in the permitted area. The two areas can also be defined dynamically, e.g. if the object changes during the printing as a result of removal or addition of object parts, such as external fittings in the case of vehicles.

The 3-D RIP generates a two- or three- or multi-dimensional matrix, wherein the existing two-dimensional (i.e. flat and curved) images are rastered while taking into account the three-dimensional surface (i.e. non-flat or curved in the chamber or bent or the like) or the data about the object obtained during the measurement of the same (e.g. AM or FM raster). In the process, the 3-D RIP can carry out expansions and/or compressions of the image.

It is important to know and take account of the fact that 3-D robot path guidance and 3-D RIP are generally dependent on each other: i) it may be necessary to sweep over a point on the surface repeatedly, for example for reasons of print quality (multi-pass printing mode), of the path guidance overall, of the local and/or adjacent radii of curvature and/or of the inkjet head selected or the geometry thereof. ii) in the case of simple surfaces, the path guidance can be determined from the measured 3-D data and the 3-D RIP will take account of the path guidance thus predefined, whereas in the case of extreme surfaces (high curvatures, edges, bends, holes), the path guidance can be determined from the predefined 3-D RIP. For instance, when the algorithms for transforming specific raster areas into one another are location-dependent and cannot be transferred simply to the entire object. iii) in the case of simple images, the path guidance can be determined from the possible robot movements and the 3-D RIP will take account of the path guidance thus predefined, whereas in the case of complicated images, the path guidance can be determined from the predefined 3-D RIP. For instance, again when the algorithms for transforming specific raster areas into one another are location-dependent and cannot be transferred simply to the entire object. It is possible to provide for one-time (single-pass) or repeated (multi-pass) sweeps over the surface.

In the 3-D RIP, it may be advantageous first to define various perspectives, for example the object from the front or from the side, and then to carry out a separate 3-D RIP for each perspective. The raster data obtained in this way can subsequently be printed on in individual steps, that is to say, for example, from the front and from the side, transitions being generated. This procedure may be advantageous if the object is substantially box-like, for example a truck or the structure of the latter. Alternatively, it may be advantageous to already combine the raster data of the various perspectives in the 3-D RIP and to print it all in one step, e.g. in the case of objects the sides of which are highly curved and merge smoothly into one another, e.g. the aerodynamic bodywork of an automobile. The same image data can also be subjected repeatedly to a 3-D RIP, for example for the same image with closed and open door or with an external component present and not present.

The path guidance can deviate locally from an otherwise more rectilinear guidance. For instance, along one side door of a motor vehicle, the printer head can be guided substantially on horizontal or vertical paths, while the head is guided around the door handle of the door on a substantially circular or elliptical path.

So-called singularities, in which two or more axes of the robot arm are collinear, can largely be avoided by the printer head being held obliquely on the robot arm. In addition, the path speed can be slowed in the area of a singularity to be expected.

During the 3-D RIP, defects or damage to the object surface, e.g. a used automobile, can also be taken into account and, if appropriate, compensated for. For example, a deformation of the surface can thus be concealed by compensating changes (expansions, compressions, etc.) in the image. The changes to be carried out during the 3-D RIP are chosen such that the optical impression of the defective or damaged point is ameliorated from at least one perspective for the observer. In order to identify such defects or damage, it may be necessary to compare the measured object data with stored, defect-free data, for example with bodywork data from factory-fresh vehicles.

During the 3-D RIP, it is also possible to take into account and compensate for undesired distortions in the printed image, which, for example, originate from the convex-concave structure of the surface, e.g. during the representation of people, texts or regular patterns.

5. Preparing the Object for the Printing

It may then be necessary to clean the object once more, for example to wash off the powder.

It may be also necessary to carry out a pretreatment before the actual printing. This can be a corona or atmospheric plasma treatment or a flame treatment. The pretreatment can be used for cleaning and/or improving adhesion. It can be chosen and adjusted in terms of intensity as a function of the material of the surface, so that, following the treatment, sections of different materials have approximately equal surface tensions and the droplets printed on spread approximately equally everywhere.

Furthermore, before the actual printing, a coating or undercoat (e.g. queller or primer) can be applied. The coating can contain an adhesion promoter or an adhesion reducer. By the coating and adjustment of the adhesive property of the surface, it becomes possible to generate an image permanently or only for a limited time interval. An image on a vehicle can thus be generated permanently or temporarily, for example only for the duration of a few days. The undercoat can also contains a white paint applied in rastered or non-rastered form, by which means the achievable color space can be expanded, in particular in the case of dark-painted bodywork parts. The coating and/or the undercoat can be applied to the entire surface of the object or to only to a selected section, preferably only to the section which is then also printed. An undercoat may also be necessary on sections of glass panes, for example, which are to be printed. Provision can also be made to provide different surface materials with different undercoats, in order to adjust the adhesive properties for the color or ink used in a specific manner and to match them to one another as far as possible. Alternatively, provision can also be made to use different colors or inks which adhere approximately equally well to surfaces of different materials.

In addition to adhesion promotion or else adhesion reduction, the primer can have the object of controlling the flow (spreading) of the ink droplets up to the time at which the droplets are hardened. In addition, the primer can condition different types of materials, e.g. glass, painted sheet metal or plastic, in such a way that identical or similar spreading of the droplets is achieved. The spreading can be adjusted in this case by the primer such that the individual droplets can also flow together to form solid surfaces. Such spreading can also be achieved by using physical pretreatments, such as a corona treatment, a plasma treatment and/or a flame treatment.

An implementation in which the primer covers the surface to be printed in white (white paint, covering varnish) is particularly advantageous. This may be advantageous, first, for subsequent highly precise 3-D measurement (if the primer application is made before the measurement) and, second, a white base is helpful for the achievement of the greatest possible color space. The white primer can consist, for example, of commercially available inkjet primers, to which $TiO_2$ is added as white pigment. The primer can be applied flatly to the object (spray, inkjet or other method); flatly only in the area in which the object is to be provided with an image (spray, inkjet or other method); or precisely accurately by an inkjet. If required, the white primer can be removed where it is not covered by raster dots or full-tone areas of the image. The primer is in this case preferably formulated such that it can be removed, for example by an isopropyl-water mixture. By using a suitable solvent, subsequent specific removal of the applied image is therefore also possible.

When printing pneumatic-tired vehicles, it may be necessary to fix the bodywork mechanically, since temperature fluctuations during the printing operation can lead to the vehicle being raised/lowered. The same is true of vehicles which are spring-mounted or, for other reasons, tend to inherent movements. Such vehicles can be fixed, for example, at the attachment points for vehicle jacks.

It is advantageous if the object does not have to be moved during the entire process. If it nevertheless has to be moved to another location and back again, for example for measurement and/or cleaning, it is necessary to position the object with specific accuracy subsequently relative to the printing apparatus, for example accurately to about 10 to about 100 micrometers. Additionally or alternatively, the object or the position of the latter can also be measured again. In any case, at the start of the printing operation, the position of the object and the position of the printing apparatus in a common coordinate system (e.g. the hall) must be known. When printing small images, of which the position on the object permits a greater tolerance, it is possible to dispense with the positioning and/or re-measuring, for example when printing a small-format advertisement on the side door of a vehicle.

The positioning of the object can also be carried out by using a positioning device. Advantageous, for example, is a rotary table, on which the object is set down and which permits the object to be rotated, preferably through at least 180°. In this way, the printing can be carried out in two steps, for example: first, a first part of the object is printed, the object is then rotated through 180° and then the remaining part of the object is printed. 90° rotations can also be advantageous. In the case of a small automobile, for example one side, the roof and the hood can be printed, a 180° rotation can then be made, and then the second side can be printed. In the case of larger vehicles, more rotations may be necessary.

As an alternative to a rotary table, the following positioning systems can be used for the object, in particular for vehicles: positive/negative pressure systems (preferably omnidirectionally) movable platforms (in practical terms, mention should be made of the Kuka omniMove device from the Kuka company, Germany), XYZ gantries.

As an alternative or in addition to the rotary table, the positioning device can also make it possible to tilt the object. Points of the object which have to be printed from below, for example undersides of fenders, would then have the angular position thereof changed by appropriate tilting of the object, so that they can be printed on the side or underneath by using the printer head. In the case of small objects, it is also possible to move the respective object by a multi-axis robot or manipulator during the printing and to keep the printer head still or to move the latter only to a restricted extent. Furthermore, it is possible to move both the object and the printer head in a synchronized manner during the printing by respective robots. It goes without saying that the movements of the positioning device have to be taken into account in the path guidance of the robot for the printer head. It would be possible, for example, to rotate a vehicle continuously slowly on a rotary table and to print the vehicle with a multi-axis articulated-arm robot with a printer head, the rotational movement of the vehicle being taken into account.

However, provision can be made to display the anticipated image on the object two-dimensionally or three-dimensionally (virtually on a display or in actual fact) to the customer; it is then possible already to take into account all the adaptations that have been made, so that the customer is given an impression as to how the finally printed object will appear. Once more, changes can be made. The subsequent printing can also be carried out with the projection onto the object surface switched on, so that direct quality control and/or regulation of the path guidance become possible.

6. Printing

The printing apparatus preferably contains a robot and at least one printer head arranged on the robot. The printer head is preferably an inkjet head. It is possible for piezo jet, bubble jet, continuous jet and/or valve jet printer heads to be used. Piezo-controlled printer heads are preferred here.

The inkjet system used can have hydrostatic compensation, in order to keep the pressure constant in the ink lines and the ink meniscus on the nozzle openings during the movement of the head. Tank and compensation system can be guided on the robot arm together with the inkjet head, in order to minimize meniscus fluctuations. In addition, the condition and the position of the inkjet head can be detected by sensors and meniscus fluctuations can be counteracted under control. Provision can also be made to use the known path of the head in the chamber as input variable for control of the hydrostatic compensation.

Provision can be made to use one or more sensors for collision avoidance between head and object and/or for quality assurance. Optical and/or ultrasonic sensors can be used here. The working distance of the head from the surface is controlled to about ±5% to about ±100% from the desired value, preferably to about ±10% to about ±30%. In practical terms, mention should be made here of sensors from the MEL Mikroelektronik company, Germany, which can be used, for example, for the regulation to a working distance of about 10 mm±1 mm. However, provision can also be made for the position of the head and of the robot to be known very accurately, e.g. via position signals from the robot, and for the collision avoidance to be carried out merely by the point cloud from the measurement of the object representing a forbidden space for the movement of the robot and the head. However, in order to increase the safety against collision, it is advisable to provide at least one collision sensor as well.

During printing, various color and/or paint systems can be used for the printing of colored images, e.g. CMYK, RGB or else expanded color systems such as CMYK+light cyan+light magenta. It is possible for single-color or multi-colored images, chromatic images, grey-stage images or monochrome or binary images to be produced. In order to be able to generate the greatest possible color space, even on non-white objects, provision can be made to apply white color or ink (rastered or full-tone) additionally before or during the application of color.

After printing has been carried out, provision can be made to apply a protective or covering varnish to the entire object or only to the printed sections (and possibly an edge), for example in order to adjust the UV and/or scratch resistance thereof as desired.

Provision can be made to apply all the fluid media to be applied (coating, undercoat, ink, color, varnish, protective varnish, covering varnish) to the object in one pass. For this purpose, the printer head can have separate nozzles for the different media and these nozzles can be activated separately in such a way that the media are discharged in the correct order at any point of the object. Alternatively, it is also possible to provide separate heads for the media, which can be guided jointly or separately along the object.

It is possible for systems of different fluid media to be used: water-based, solvent-based, UV-hardening, hot-melt, latex, gel, sol-gel, 1-component and/or 2-component systems. In particular, use can be made of conventional paints, for example colored paints and/or clear varnishes for vehicle coatings. Water-based systems are preferred. If the printed image is to be provided only temporarily, preference is given to media which can be detached again, for example by a solvent or with hot steam.

During printing, it is necessary to synchronize the movement of the robot and the path guidance with the activation of the printer head, i.e. the printer head must be activated in its respective position of the path with that image data for opening the nozzles which is to be printed at the position. Provision can be made for the position of the printer head and the direction of movement of the same to determine the supply of data. Conversely, however, provision can also be made for the supply of data to determine the position of the printer head and the direction of movement of the same. As a third possibility, provision can be made for a change to be made to and fro between the two aforementioned possibilities, depending on the surface of the object and/or the image data.

If the surface of the object has high curvatures and/or undercuts, it may be advantageous to use different printer heads having different geometries, for example small printer heads in order to be able to print in narrow areas (e.g. vehicle door handles), and large, flat printer heads in order to be able to print flat surfaces quickly and with as few tracks as possible (for example the roof of a vehicle). It is also possible to use printer heads which achieve different resolutions, e.g. a 100 dpi and a 300 dpi head. If printing is carried out in only one color, it is also possible, instead of an inkjet printer head, to provide a pen or a spray nozzle, which are guided by the robot.

Provision can also be made to use what is known as an air knife, in order to improve the positioning accuracy of the nozzle head, for example by air vortices and entrained flows being reduced or even avoided. The air knife produces a defined airflow and, together with the head and arranged upstream of the latter, is moved along the surface of the object. The air knife can also be formed in such a way that the shape thereof can be matched to the local surface shape of the object, for example in terms of the local curvature/s of the latter. The use of the air knife can advantageously also lead to it being possible to choose the distance of the head from the surface to be greater or for the droplets produced by the head to fly precisely toward the surface over a further distance. Alternatively or additionally to the air knife, supporting flows around individual nozzles, around nozzle groups or around all the nozzles of the head, which support the precise transfer of the droplets, can be provided.

On non-flat surfaces (e.g. curved or with bends), the respective distances of the individual nozzles of an inkjet head from the surface of the object are different from one another at a specific time, which has a detrimental effect on the imaging quality. Instead of moving over the surface in parallel tracks, the path guidance can therefore advantageously be configured such that the respective distances of the nozzles from the surface of the object at a specific time are as equal as possible to one another. For this purpose, the head can be guided for example over a bend such that a row of nozzles of the head is aligned substantially parallel to the bend. Locally, for example at bends, it is therefore possible to depart from an otherwise rather more line-like path guidance, it being ensured that an already printed point of the surface is not printed a second time, for example by an already printed image point being marked as "printed" in the control system.

Since the printer head is generally not sufficiently large and the surface of the object is generally too complex to produce the image in one pass, it will be necessary in most cases to apply the printed image in sections, e.g. in tracks. The tracks must be joined seamlessly to one another, so that it is not possible to detect in the finished printed image the points at which the printed image has been joined. However, joining may also be necessary if the robot cannot be moved sufficiently far to print the whole of the object or at least a large area of the object in one pass. For example, if a small articulated-arm robot with inkjet head is used and when printing large vehicles, it may occur that the arm reaches only as far as about the middle of the roof. This problem can be solved by the object and/or the robot being moved relative to each other, for example the vehicle can be rotated through 180°. If necessary, the position of the object must be measured again following the movement. In any case, the overall image must be assembled from partial images; the joining of the partial images to one another should be carried out without gaps and without overlaps, if the latter would be found to be disturbing to the human eye. Even in these examples, it becomes possible to see how important the exact synchronization between robot movement and printer head activation is: during printing, it must be known with sufficient accuracy at every time where printer head and object are located relative to each other or absolutely in space.

The printer head can be guided by the robot under open-loop but also closed-loop control. Closed-loop control can contain a sensor which determines the current actual position of the printer head and feeds it to a control device, which compares this value with the desired position and, if necessary, corrects the same. The closed-loop control can be used to avoid visible and disturbing joining points.

Closed-loop control at 500 Hz with a desired accuracy of $\frac{1}{10}$ mm achieves a path speed of 0.05 m/s. When a 10 cm wide printer head is used, a printing speed of 18 $m^2$/h can thus be achieved (1.8 $m^2$/h at 1 cm width). If provision is made to operate with exchangeable heads of different widths between 1 and 10 cm (narrow head for highly curved sections, wide head for substantially flat areas of the surface), then an average printing speed between about 1.8 $m^2$/h and about 18 $m^2$/h is achievable. As compared with the conventional application of film according to the prior art, which reaches about 1 $m^2$/h, the method described offers a considerable speed advantage.

On the other hand, if the path guidance is defined in advance and is subsequently carried out without closed-loop control, then the following printing speeds are possible: the desired accuracy of $\frac{1}{10}$ mm has been achieved at 0.5 m/s, and a 1 cm or 10 cm wide head prints 18 and 180 $m^2$/h, respectively. A relatively flat area can therefore be printed very quickly, for example a truck side wall of 30 $m^2$ in about 10 minutes using a 10 cm head.

In the case of vehicles, the joining of partial images to one another can also be achieved by surface sections of the bodywork as far as the gaps between the bodywork parts being printed in one pass, i.e. the joining points are dispensed with, since they come to lie accurately on the gaps. However, this assumes that the robot is dimensioned and configured to be mobile in such a way that it is able to print at least the individual bodywork parts, such as hood, wings, doors, roof and tailgate, in each case without any repositioning of the robot and/or the vehicle. The robot should therefore be able to sweep over at least areas from about 1 to about 2 square meters and have a range from about 1 to about 3 meters.

It may be advantageous to measure and also to print the object repeatedly, for example if the object has movable or removable parts. In the case of a vehicle, such parts could be, for example, spare wheels on the tailgate, spoilers, roof boxes and/or doors. The 3-D measurement is then carried out in each case with and without the part or in situations in which the part, for example the door, is located in different positions. Object data which permits the printing of the object without the part is then available, e.g. without the roof box, and with the part, that is to say, for example, with the roof box. The printing can then be carried out firstly only for the object on its own in a first step and, in a second step, only for the part on its own, the part being removed in the first step and re-fitted in the second step. This is correspondingly true of movable parts: in the first step, the part is in a first position and, in the second step, in a second position. In the case of a door that can be swiveled, the door is, for example, first printed from the outside in the closed state and then, in the open state, the door is printed at the edges and, if appropriate, even on the inside. In addition, the door recess can also be printed with the door open.

In order to increase the range of robot arms, provision can advantageously be made to mount the robot arm such that it can be rotated and/or displaced, for example on a linear guide. A guide can be provided on the hall floor, the hall wall or the hall ceiling. Alternatively, the robot arm can also be arranged on an XYZ gantry, i.e. on a gantry which permits the robot arm to be displaced relative to the object in the three spatial directions. Once more, it is advantageous to acquire the current position of the robot arm and to take the position into account during the dedicated activation of the robot arm and that of the printer head. Instead of a robot arm, the printer head itself can also be arranged directly on the XYZ gantry, preferably rotatably. A gantry can also receive further units, for example those for cleaning, drying and hardening.

The gantry can contain two vertical columns and a horizontal cross-member. The columns can be moved in a coordinated manner and horizontally on a guide. The cross-member can be moved vertically and holds a printer head that can be moved horizontally and possibly also extended and/or swiveled. It is also possible to construct the gantry in a curved shape, for example in the form of a semicircle, and to hold the at least one printer head such that it can be moved thereon. The printer head can thus be moved from one side of the object as far as the opposite side. In addition, a robot arm with a printer head can also be arranged such that they can be moved on a curved gantry.

For printing with small and lightweight printer heads, it is also possible to use what is known as a Bionic Handling Assistant from the Festo company, Germany or something comparable as a robot arm. On account of their high mobility and deformability, the bionic system can even print areas that are difficult to access.

Mobile applications are also conceivable, for example for the printing of garage doors, (traffic) signs, advertising areas or facades. The robot with the printer head is configured to be as compact and as light as possible for mobile applications and, if appropriate, mounted on a vehicle or a movable elevating platform. Small robot-printer head devices can also be used for printing furniture and/or electrical/electronic devices.

7. Drying

The printed image and the fluid media used can be subjected to drying and/or hardening. For instance, provision can be made to allow solvents that are used to evaporate or to evaporate the same actively, for example by using radiation and/or heat, such as infrared or near infrared radiation, in particular laser, laser diode or VCSEL radiation, or hot air, or using an appropriate device or an appropriate array. Provision can also be made, for example, to carry out ultraviolet hardening, for example by using a device generating appropriate UV radiation, such as a UV tube, UV LED and/or electron beams. If appropriate, the printer heads have to be protected against radiation, for example by masks.

In an advantageous embodiment, the device for drying and/or hardening is implemented as a head and received on a robot. The head can then be guided along the surface of the object by the robot and dry the applied medium locally. Provision can be made for the printer head and the head for drying and/or hardening to be held on the same robot or for both to be provided as exchangeable heads and held alternately by the robot. The head for drying and/or hardening is preferably arranged adjacent to the printer head on the robot and dries/hardens the printed image immediately following the printing, i.e. the two heads are guided on approximately the same track but after or beside one another.

The drying/hardening can be carried out separately for each medium (directly following the application thereof) or, alternatively, a plurality of media applied over one another can be dried jointly (directly following the application of the last of the media).

It is of particular advantage to carry out the drying/hardening in accordance with an image, in such a way that only those sections of the surface of the object (possibly with an edge) which are also occupied by a printed medium are treated.

If the printed image is intended to be provided only temporarily, the drying/hardening can be carried out only partially, that is to say only for so long or to such an extent that the medium has been dried/hardened sufficiently in order to adhere to the object for a predefined time interval and, in the process, to preserve the image characteristics adequately. The incomplete drying/hardening achieved in this way can lead to the medium being removable again, for example by using a suitable solvent such as acetone and/or by rubbing. When 2-component systems are used, this can be achieved by appropriate adjustment of the ratios of the quantities of the respective individual components.

In the case of UV hardening, it may be necessary to prevent the printed image points running too severely before the hardening (prevention of so-called bleeding). To this end, the hardening can be carried out immediately following the application of the medium, preferably in the form of only partial initial hardening (so-called freezing or pinning) with a reduced radiation dose, since this also prevents too much radiation reaching the printer head (possibly arranged adjacently) and hardening the medium in or on the nozzles. An alternative solution consists in partitioning off the printer head (possibly arranged adjacently) or choosing the radiation direction of the head for hardening away from the printer head or arranging and guiding the head for hardening at a sufficient distance from the printer head. Again alternatively, it is also possible to use so-called phase-change inks, which are printed in a heated and highly liquid state and harden on the cooler object in a short time interval or preferably immediately.

8. Further Possibilities

It is also possible to change an image printed onto the object after a time interval, for example by the existing image being wholly or partially overprinted; wherein the area to be overprinted can previously be removed. In the case of an advertisement printed onto a vehicle, for example the current price and/or a current sales deadline/location can be adapted. Images which are no longer desired can be overprinted with new, desired images. Images which, for example, have been scratched or bleached out can be improved at some points or completely.

Additionally or alternatively, it is possible to print further images beside already present images after a time interval, and in this way to gather more and more images on the object over time. In the case of a vehicle, the customer can decide on further images gradually in this way and put the latter together like tattoos to form an overall appearance.

The method described in this application also permits the printing of official signs, test stamps, badges. In the case of a vehicle, for example, it would be possible to print on the license plates and/or the testing authority marks. To this end, the software for generating the image would be provided with the necessary data, for example via a secure and authenticated database access to an appropriate database of an authority and/or the testing authority. Advantageously, such printed symbols, etc. cannot be stolen.

It is possible not only for optically perceptible structures to be printed but also structures which fulfill other functions, for example those which are electrically conductive and function as conductor tracks. In this way, electric circuits can be printed onto the surfaces of 3-D objects: OLEDs or other light-emitting elements. In the case of vehicles it is, for example, possible to print on the lights, in particular the brake lights, luminous license plates or other patterns.

Instead of the application of static images, provision can also be made, by thin-layer printing processes for electronic structures on the object surface, to generate at least one display, which permits the display of changing images or films, e.g. an OLED display.

When two printer heads are used, it is possible to print two components of a 2-component system one after another at a specific point on the object, the components reacting with one another at the point, if appropriate under the action of radiant energy, and hardening. The hardened material can lead to a contour change and, for example, improve a damaged point, or can change the roughness or the visual impression of the surface.

In a similar way, a repair of the object can be carried out in an automated manner: the object is measured, points to be repaired are identified by a comparison with the data from an original object, the printer head applies a repair material (e.g. a filler compound), a further head grinds off the applied material and a third head paints the repaired point of the object.

Instead of a robot, a manually guided printer head is also possible, which is supplied with control data for the printing as a function of its absolute position in space or its relative position in relation to the object.

The invention as such and constructively and/or functionally advantageous developments of the invention will be described in more detail below with reference to the associated drawings and by using at least one preferred exemplary embodiment. In the drawings, mutually corresponding elements are provided with the same designations in each case.

Other features which are considered as characteristic for the invention are set forth in the appended claims.

Although the invention is illustrated and described herein as embodied in a method and a system for printing an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
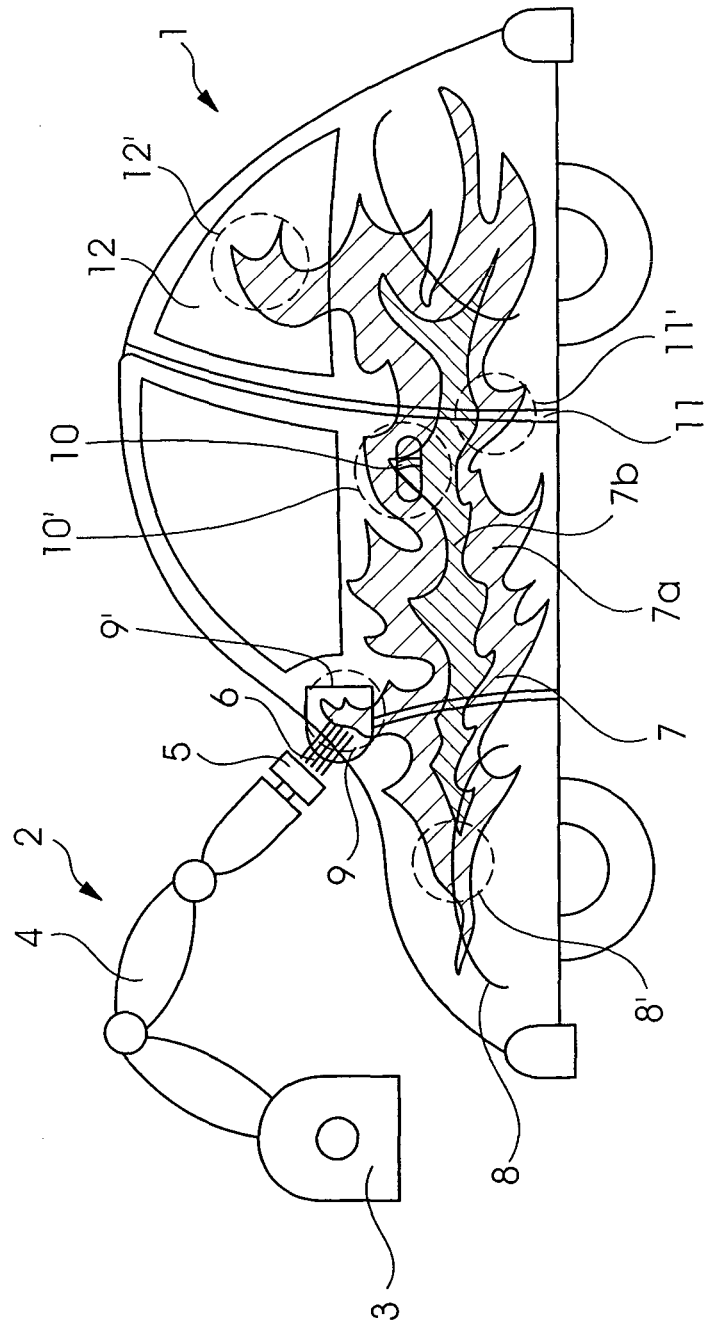
FIG. 1 is a diagrammatic, side view of a preferred exemplary embodiment of a system according to the invention having an articulated-arm robot.

Referring now to the figures of the drawing in detail, there is shown in FIG. 1 a vehicle 1, which is printed by a system 2. The system has a base 3 and a robot 4 (articulated-arm robot) containing multiple movable limbs, and a printer head 5 arranged thereon. The base 3 can be mounted such that it can rotate and move, so that the arm 4 with the printer head 5 for the printing can reach all points of the vehicle 1. During the printing, the printer head 5 is located at a short distance from a surface of the vehicle 1 and expels ink droplets 6, which have sufficient momentum to reach the surface. The distance can be about 1 cm.

The vehicle 1 is printed with an image 7. The image can have different areas 7a and 7b. These areas can differ, for example, in that they have different colors. They can also differ in that one area is printed in a rastered manner (in the half-tone process) and one area is printed in an unrastered manner (in the full-tone process).

The vehicle 1, as an object to be printed, has a curved surface, for example a front fender or wing 8, which curves out from the side wall and therefore has both convex and also concave curvatures. The curvatures can have very small radii and even be present as bends (radius 0 degrees). It can be seen that the image 7 even reaches over the wing 8 and is applied in this case to an area 8' of the surface, which can have various curvatures and also bends.

It can also be seen that the image 7 is applied to an exterior mirror 9 in an area 9'. The system thus also permits the printing of external fittings which are arranged on the surface. In an area 10', it can be seen that the system also permits the printing of what are known as undercuts, for example door handles. To this end, a very small printer head which can dip into the area of the door handle is temporarily provided.

The printing of edges is also possible: a gap 11 between a side door and the bodywork is printed as far as possible with the door closed and then, with the door open, is finally printed, if appropriate once more with a very small printer head coming into use only temporarily. From a few meters distance, the image 7 appears to reach over the gap 11 without interruption. Printing is also possible in an area 12' of a windowpane 12, i.e. on another material (glass instead of painted metal).

The system according to the invention thus advantageously permits the complete surface of the complexly shaped vehicle 1 to be provided with any desired multicolored image 7. The image can also be monochrome and simply the painting of the vehicle 1. However, the vehicle 1 is preferably already painted and the image 7 is applied only locally for the purpose of decoration or in order to carry information (e.g. advertising).

Figure 2:
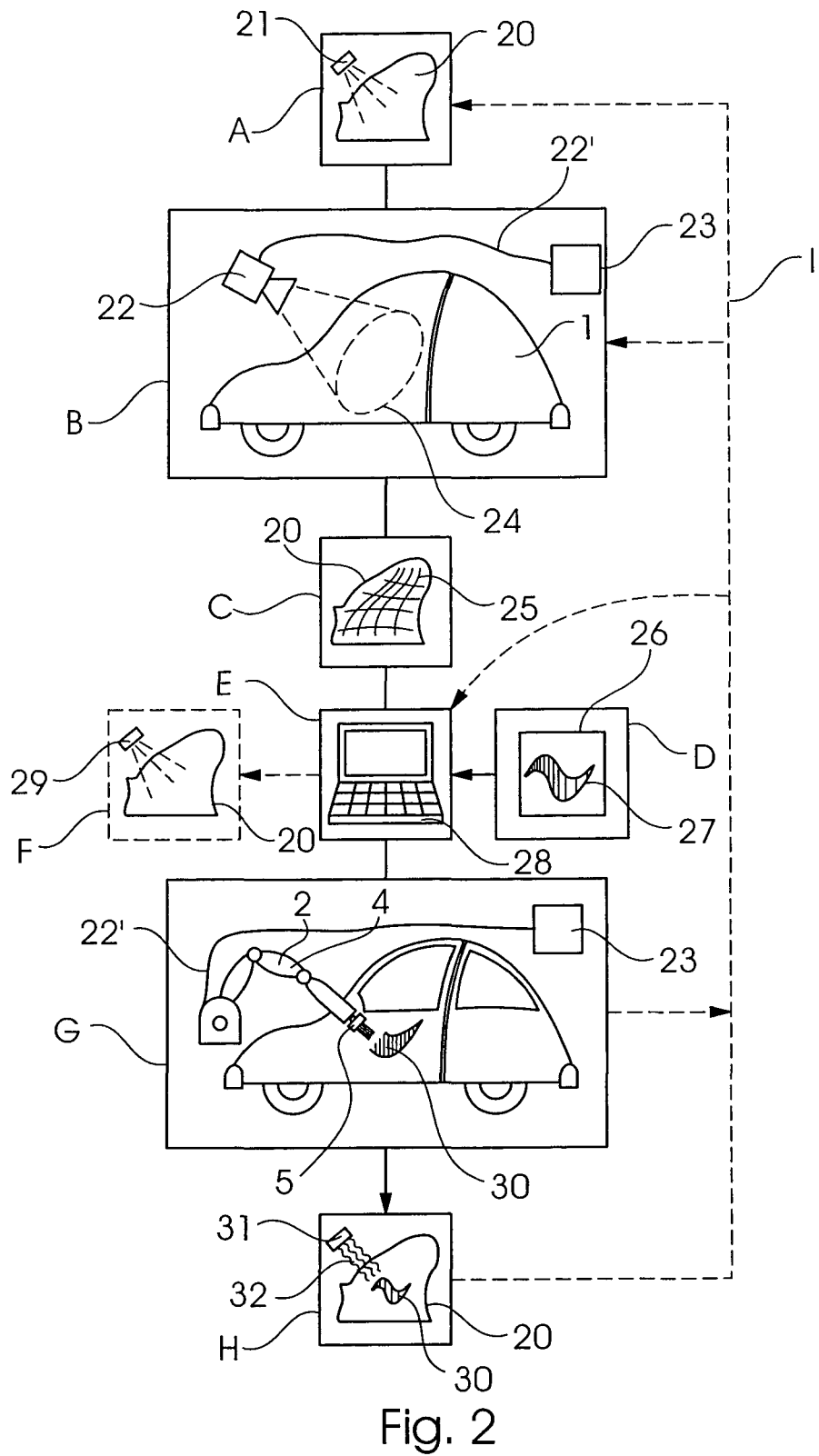
FIG. 2 is an illustration of a preferred exemplary embodiment of the system according to the invention.

FIG. 2 shows a schematic illustration of a preferred exemplary embodiment of the system according to the invention as a method sequence.

In step A the vehicle 1 is prepared in accordance with number 2 (see above) for the measurement. To this end, the bodywork 20 is cleaned by a cleaning device 21, at least in some sections, and if necessary then dried and powdered.

In step B the vehicle 1 is measured in accordance with number 3 (see above). A measuring device 22 detects the surface of the vehicle 1 in measuring areas 24 and leads the measured data via a connection 22' to a computer 23.

In step C the measured vehicle data is reworked in accordance with number 4 (see above), i.e. by using a point cloud from surface points of the bodywork 20, the windowpanes and any existing external fittings such as mirrors are used to calculate a network 25, which reproduces the measured surface with the accuracy needed for the subsequent printing (preferably about 1/10 mm).

In step D the data of the printing image 26 is prepared in accordance with number 1 (see above), i.e. first selected and then pre-processed, for example subjected to transformations such as distortions 27, so that the selected image is matched to the course of the vehicle surface.

In step E a computer 28, which can be identical to the computer 23, is provided with both the measured and further-processed data 25 about the vehicle surface and also data relating to the image 26 to be printed. The computer 28 then carries out the so-called 3-D RIP in accordance with number 4 (see above).

In an optional step F the vehicle 1 or the bodywork of the latter is cleaned before the printing by a cleaning device 29, at least in some sections, in accordance with number 5 (see above), for example in order to remove the powder.

In step G the printing is then carried out in accordance with number 6 (see above) by the system 2 containing the robot 4 and the printer head 5. In the process, the computer 23 or another computer controls the path guidance and the discharge of ink via a connection 22', in such a way that the image 30 is produced on the bodywork.

In step H the finished image 30 is dried by a drying device 31, for example a dryer emitting UV radiation 32, to such an extent in accordance with number 7 (see above) that the vehicle can be removed from the system 2 or that, in a step I, a further pass of the method can be carried out, beginning at A, B or E.

The following is a summary list of reference numerals and the corresponding structure used in the above description of the invention:
1 Vehicle
2 System
3 Base
4 Robot
5 Inkjet printer head 6 Droplet
7 Image
8 Wing
8' Area
9 Exterior mirror
10 Door handle
10' Area
11 Gap
11' Area
12 Windowpane
12' Area
20 Bodywork
21 Cleaning device
22 Measuring device
22' Connection
23 Computer
24 Measuring area
25 Network
26 Image to be printed
27 Transformations
28 Computer
29 Cleaning device
30 Image
31 Drying device
32 UV radiation
A Method step (cleaning)
B Method step (measuring)
C Method step (processing vehicle data)
D Method step (processing image data)
E Method step (creating raster matrix)
F Method step (cleaning)
G Method step (printing)
H Method step (drying)
I Method step (further pass)

The invention claimed is:

1. A method for printing an object, wherein at least one area of a surface of the object is printed, which comprises the following method steps of:
providing an image;
providing three-dimensional data of the object by three-dimensionally measuring at least the area of the object or by loading the three-dimensional data of the object from a database;
generating a number of spatial points corresponding to the area;
generating a three-dimensional network corresponding to the area;
generating path data being a predetermined three-dimensional path for moving a robot for an inkjet printer head or for the object, wherein the predetermined three-dimensional path defining areas into which the robot must not penetrate and areas in which the robot can move freely and in the areas in which the robot can move freely the predetermined three-dimensional path defining distances between nozzles of the inkjet printer head and the surface of the object being as equal as possible to one another at a specific point in time, and the distances between the nozzles and the surface of the object varying over time in dependence on a geometry of the object being printed;
generating raster data for actuating the inkjet printer head;
moving the robot by utilizing the path data; and
printing the image by the inkjet printer head, utilizing the raster data.

2. The method according to claim 1, which further comprises performing at least one of the following synchronization method steps:
printing the image in dependence on a movement of the robot; or
moving the robot in dependence on the image to be printed.

3. The method according to claim 1, which further comprises drying and/or hardening and/or pinning of the color or paint by using a robot-guided dryer head following the printing.

4. The method according to claim 1, which further comprises cleaning at least the area before the three-dimensional measuring.

5. The method according to claim 1, which further comprises performing one of the following method steps:
performing a static three-dimensional measurement of the area by using a fixed-location measuring system during the measurement; or
performing a dynamic three-dimensional measurement of the area by using a robot-guided measuring head.

6. The method according to claim 1, which further comprises applying an undercoat and/or a primer, at least in the area, before the printing.

7. The method according to claim 1, which further comprises performing at least one of the method steps of:
printing a first part of the image with the inkjet printer head;
moving the object into a changed position; and/or
printing a second part of the image with the inkjet printer head.

8. The method according to claim 1, which further comprises changing the inkjet printer head for another, different type of printer head.

9. The method according to claim 6, which further comprises:
providing the undercoat or the primer with an adhesion reducer; and
producing the image only for a limited time interval.

10. The method according to claim 1, wherein by observing the areas into which the robot must not penetrate, it is achieved that the robot does not collide with the object and maintains a minimal distance.

11. The method according to claim 6, which further comprises drying and/or hardening and/or pinning of the color or the paint by using a robot-guided dryer head following the printing via ultraviolet radiation, NIR radiation, IR radiation, hot air and/or laser radiation.

12. The method according to claim 4, which further comprises washing, drying and powdering at least the area before the three-dimensional measuring.

13. The method according to claim 7, which further comprises rotating the object into a changed position.

14. The method according to claim 10, wherein it is achieved that neither the inkjet printer head received at the robot nor any part of the robot, including limb parts and joints, collide with the object and maintain the minimal distance.

15. The method according to claim 9, which further comprises providing white paint as the adhesion reducer.

16. A system for printing an object, which prints at least one area of a surface of the object, the system comprising:
a cleaning device for cleaning at least the area;
a measuring device for three-dimensionally measuring at least the area and for generating measured results for providing three-dimensional data of the object or said measuring device receiving the three-dimensional data of the object by loading the three-dimensional data of the object from a database;
a computer for generating a raster matrix;
a robot having an inkjet printer head with nozzles;
a device for generating path data being a predetermined three-dimensional path for moving said robot having said inkjet printer head or the object, wherein the predetermined three-dimensional path defining areas into which said robot must not penetrate and areas in which said robot can move freely and in the areas in which the robot can move freely the predetermined three-dimensional path defining respective distances between said nozzles of said inkjet printer head and the surface of the object being as equal as possible to one another at a specific point in time, and the distances between the nozzles and the surface of the object varying over time in dependence on a geometry of the object being printed;

at least one effector;

a computer for activating said robot; and a computer for actuating said effector.

17. The system according to claim 16, wherein:

said robot is selected from the group consisting of an articulated-arm robot, a parallel kinematic robot and a gantry robot; and said at least one effector is selected from the group consisting of said inkjet printer head, a UV drying head, a measuring head and a projection head.

18. A method for printing an object with at least one image, wherein the image is chosen by a customer and the image chosen is printed onto the object on a surface area chosen by the customer by a service provider, which comprises the steps of:

providing the image;

providing three-dimensional data of the object by three-dimensionally measuring at least the area of the object or by loading the three-dimensional data of the object from a database;

generating a number of spatial points corresponding to the area;

generating a three-dimensional network corresponding to the area;

generating path data being a predetermined three-dimensional path for moving a robot for an inkjet printer head or for the object, wherein the predetermined three-dimensional path defining areas into which the robot must not penetrate and areas in which the robot can move freely and in the areas in which the robot can move freely the predetermined three-dimensional path defining distances between nozzles of the inkjet printer head and the surface of the object being as equal as possible to one another at a specific point in time, and the distances between the nozzles and the surface of the object varying over time in dependence on a geometry of the object being printed;

generating raster data for actuating the inkjet printer head;

moving the robot by utilizing the path data; and printing the image by the inkjet printer head, utilizing the raster data.

19. A method for printing an object with at least one image, wherein the image is chosen by a customer and wherein the image chosen is printed onto the object on a surface area chosen by the customer by a service provider, which further comprises:

providing a system for printing the object, the system printing at least one area of a surface of the object, the system comprising:

a cleaning device for cleaning at least the area;

a measuring device for three-dimensionally measuring at least the area and for generating measured results for providing three-dimensional data of the object or said measuring device receiving the three-dimensional data of the object by loading the three-dimensional data of the object from a database;

a computer for generating a raster matrix;

a robot having an inkjet printer head with nozzles;

a device for generating path data being a predetermined three-dimensional path for moving said robot having said inkjet printer head or the object, wherein the predetermined three-dimensional path defining areas into which said robot must not penetrate and areas in which said robot can move freely and in the areas in which the robot can move freely the predetermined three-dimensional path defining respective distances between said nozzles of said inkjet printer head and the surface of the object being as equal as possible to one another at a specific point in time, and the distances between the nozzles and the surface of the object varying over time in dependence on a geometry of the object being printed;

at least one effector;

a computer for activating the robot; and a computer for actuating the effector.

20. The method according to claim 6, wherein the undercoat or the primer has an adhesion reducer being a white paint and that the image is only generated for a limited time.

* * * * *